United States Patent

Motsinger et al.

[15] 3,693,749
[45] Sept. 26, 1972

[54] REDUCTION OF GAS TURBINE ENGINE NOISE ANNOYANCE BY MODULATION

[72] Inventors: Russell E. Motsinger, Cincinnati; Edwin B. Smith, Mason, both of Ohio

[73] Assignee: General Electric Company

[22] Filed: April 26, 1971

[21] Appl. No.: 137,516

[52] U.S. Cl. ............181/33 F, 181/33 L, 181/33 H, 181/33 P
[51] Int. Cl. ..........................F01n 1/06, B64d 33/06
[58] Field of Search .......181/33 R, 33 C, 33 D, 33 F, 181/33 H, 33 HA, 33 HB, 33 HC, 33 HD, 33 L, 33 P, 44–46, 56; 239/265.11, 265.13

[56] References Cited

UNITED STATES PATENTS

| | | | |
|---|---|---|---|
| 2,853,852 | 9/1958 | Bodine | 181/33 L |
| 2,783,008 | 2/1957 | Bodine | 181/33 L |
| 2,957,537 | 10/1960 | Morgan | 181/33 F |
| 2,990,905 | 7/1961 | Lilley | 181/33 F |
| 3,009,529 | 11/1961 | Brown | 181/33 F |
| 3,576,232 | 4/1971 | Lebert | 181/33 F |

FOREIGN PATENTS OR APPLICATIONS

| | | | |
|---|---|---|---|
| 1,194,562 | 5/1959 | France | 181/56 |
| 859,276 | 6/1940 | France | 181/33 L |
| 865,661 | 4/1961 | Great Britain | 181/33 HC |

OTHER PUBLICATIONS

L. Wallace Dean, III; " Interactions Between Sound Waves," The Journal of the Acoustical Society of America, Vol. 34, No. 8, August 1962 issue, pp. 1039–1044

*Primary Examiner*—Robert S. Ward, Jr.
*Attorney*—Derek P. Lawrence, Thomas J. Bird, Jr., Lee H. Sachs, Frank L. Neuhauser, Oscar B. Waddell and Joseph B. Forman

[57] ABSTRACT

Method and apparatus for reducing the audible or annoying sound i.e., the noise emanating from a gas turbine engine are described. The sound energy is modulated by imposing on it a higher frequency sound source, which may be of either higher or lower intensity. In one form, the modulation is achieved by producing a higher frequency sound source with an ultrasonic siren. The higher frequency sound energy and the sound energy generated by the gas turbine engine interact so that the original tones disappear and two new tones appear, the new tones being at frequencies which occur at the sum and at the difference of the frequencies of the original tones.

10 Claims, 3 Drawing Figures

PATENTED SEP 26 1972  3,693,749

INVENTORS.
RUSSELL E. MOTSINGER
EDWIN B. SMITH

T.J. Bird, Jr.
AGENT.

REDUCTION OF GAS TURBINE ENGINE NOISE ANNOYANCE BY MODULATION

BACKGROUND OF THE INVENTION

The present invention relates generally to the field of gas turbine engine noise, and, more particularly, to method and apparatus for reducing the annoyance of such noise by modulation.

Objectionable noise levels of aircraft operating at low levels over populated areas, particularly adjacent to airports, are one of the most serious problems facing the aerospace industry. Not only are the number of aircraft in operation increasing at an accelerated rate, but the development of larger wide bodied aircraft has resulted in noise levels and frequency of noise intrusions which have both sociological and economic consequences on the areas affected by the operation of such aircraft. The future generation of supersonic aircraft will provide even further problems for the industry. In addition, the ever expanding use of gas turbine engines for electrical generation, marine propulsion, and similar operations present further problems to engineers attempting to reduce the annoyance caused by noise generated by such engines.

The sound emitted by conventional gas turbine engines can normally be broken down into two components, i.e., the jet exhaust noise and the turbomachinery noise. The jet exhaust noise is conventionally considered to be caused by the turbulence in the free stream boundary between the exhaust gases and the ambient air, while turbomachinery noise is normally considered to be generated by the interaction of pressure fields generated by the turbomachinery blading. While the present invention has general applicability to both jet exhaust noise and turbomachinery noise, its primary impact will be the reduction of annoyance of noise generated by turbomachinery.

Rotating turbomachinery generates audible tones over a range of frequencies for which the human ear is particularly sensitive. All previous work on reducing the annoyance of turbomachinery noise has been directed toward reduction of the noise source, by absorption of the noise with acoustic treatment, or by changing the directivity pattern of the radiated noise. This is true whether the noise be generated by rotating turbomachinery or by the exhaust jet. As a result of this effort, new generations of gas turbine engines are considerably more quiet than previous engines. All such attempts at reducing the noise source, however, result in more complicated, heavier, and costlier gas turbine engines.

SUMMARY OF THE INVENTION

It is an object of the present invention, therefore, to provide method and apparatus for reducing the annoyance of gas turbine engine noise without the necessity of reducing the actual noise source by absorption or by changing the directivity pattern of the radiated noise.

Briefly stated, this objective is achieved by modulating the sound energy of the engine with an additional higher frequency sound source as produced, for example, by an ultrasonic siren. One or more such sirens are positioned at various locations within the engine to generate a higher frequency sound source which interacts with the much lower frequency turbomachinery sound source to provide new tones which occur at frequencies at the sum and difference of the frequencies of the original tones. The acoustic siren is chosen such that the new tones occur in the ultrasonic region, which attenuate rapidly with distance and therefore produce less annoyance at some fixed distance from the engine.

DESCRIPTION OF THE DRAWING

While the specification concludes with a series of claims particularly pointing out and distinctly claiming the subject matter of this invention, an understanding of the invention will be gained from the following detailed description of a preferred embodiment, which is given in connection with the accompanying drawing, in which:

DESCRIPTION OF A PREFERRED EMBODIMENT

Figure 1:
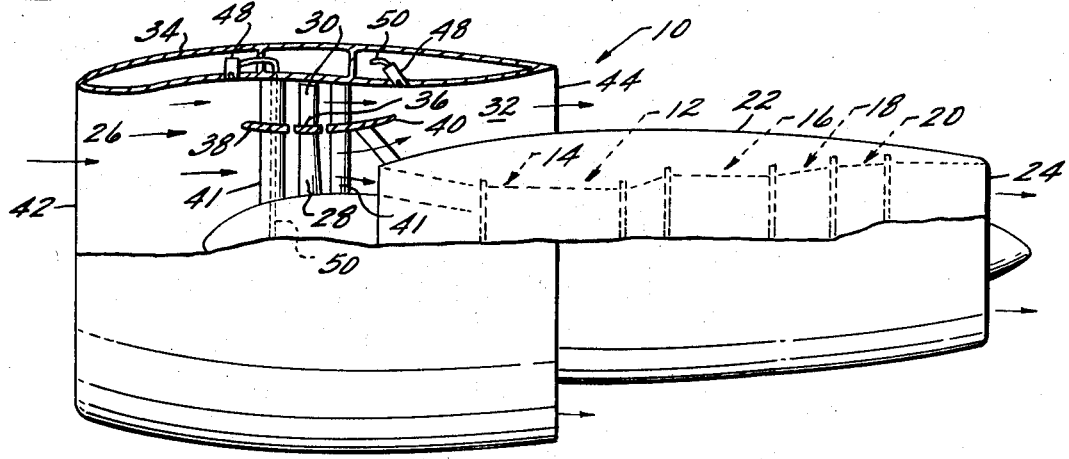
FIG. 1 is a partially schematic, cross-sectional view of a typical turbofan engine incorporating the present invention.

Referring now to the drawing, Fig. 1 shows in simplified fashion a gas turbine engine 10 of the high bypass type comprising a core engine 12 which is essentially a turboshaft engine in that it includes a compressor 14, a combustor 16, a gas generator turbine 18 for driving the compressor 14, and a power turbine 20 arranged in axially spaced serial flow relationship. The inner turbomachine or core engine 12, is enclosed within a cylindrical casing 22 which terminates at its downstream end in an exhaust nozzle 24 through which the combustion products may be discharged to produce thrust. In order to provide additional thrust, a fan 26 is mounted upstream of the core engine 12 and is driven by the power turbine 20. The fan 26 includes inner and outer compressor blades 28 and 30, respectively, which extend radially outwardly of the casing 22 across a bypass duct or passageway 32 defined between an outer cylindrical casing 34 and the core engine casing 22, the blades 28 and 30 being interconnected by platforms 36.

The platforms 36 are aligned with stationary shroud members 38 and 40 carried by a plurality of stator vanes 41 extending radially inwardly from the casing 34. It will thus be noted that air drawn through an inlet opening 42 at the upstream end of the casing 34 is accelerated by the fan 26 after which a portion of the air passing through the inner blades 28 is supplied to the core engine 12 to support combustion therein. The remainder of the air flows through the bypass passageway 32 from which it is normally discharged in the axial downstream direction through an outlet opening 44.

The gas turbine engine 10 is a high bypass ratio machine; by the term "high bypass ratio" it is meant that the ratio of mass flow of fluid in the bypass passageway 32 to mass flow in the core engine 12 is high. While the description of the present invention is given in connection with the previously described high bypass ratio engine 10, it should be noted that the invention is also applicable to straight turbojet engines, augmented turbojet engines, augmented turbofan engines, etc. Furthermore, while the present description is limited to aircraft gas turbine engines, it will become readily apparent that the present invention may be applied to gas turbine engines used for marine propulsion, generating electricity, powering of oil pipelines, etc. The present description is therefore meant to be merely illustrative of the many uses of the present invention.

One characteristic of every high bypass ratio engine is that the diameter of the bypass fan is much larger than the diameter normally associated with the compressor or turbine section of the core engine. Because of this large diameter, the rotation of the fan 26 may result in unacceptable noise levels unless some provision is made for reducing the intensity of noise generated by such a fan. All previous attempts at reducing the intensity have been directed toward reduction of the noise source itself, by absorption of the noise with acoustic treatment in the form of acoustic panels, by varying the number and spacing of the blades, or by attempting to change the directivity pattern of noise radiating from either the inlet or the exhaust of the fan duct.

In contrast with the above approaches, the present invention proposes to reduce or eliminate the sound energy generated by the rotation of the fan blades 28, 30 from the range of sensitive human response by modulating such sound energy with an additional, higher intensity, higher frequency sound source. In light of this, one or more ultrasonic sirens 48 are positioned within the casing 34 just upstream of the fan stator vanes 41. In addition, one or more of the ultrasonic sirens 48 are positioned within the passageway 32 downstream of the fan. The ultrasonic sirens 48 are supplied with any suitable source of pressurized air. In the present case, air is bled from one of the downstream stages of the compressor 14 and is supplied internally through the core engine 12 to tubing 50 which extends through the fan stator vanes 41. Air from the tubing 50 is then delivered to the ultrasonic sirens 48.

The interaction of the sound energy of the turbomachinery noise and the sound energy of the ultrasonic siren 48 will best understood by means of an example. Assume, first of all, that the blade passing frequency of the fan rotor is 3,000 Hz and that the sound power level is approximately 150 decibels. Assume further that the frequency of the ultrasonic siren 48 is 25,000 Hz and the sound power level is approximately 160 decibels. Experimentation has shown that these two acoustic tones will interact so that the energy in the original tones will be transferred into a series of new tones, as indicated by curve C of Fig. 2, the new tones being at frequencies which occur at the sum and at the difference of the frequencies of the original tones. In our example, two of the new tones would thus appear at 28,000 Hz (the sum of 25,000 Hz and 3,000 Hz) and 22,000 Hz (the difference of 25,000 Hz and 3,000 Hz). Experimentation has further shown that these new tones will have a sound power level of approximately 160 decibels, i.e., the sound power level of the ultrasonic siren 48.

The net effect of the above energy interaction has been to eliminate the 3,000 Hz acoustic tone. While the range of audibility for the normal ear is between 20 Hz and 15,000 Hz, it is a known fact that the frequency of maximum sensitivity for normal ears is in the vicinity of 3,000 Hz. The net result of the above interaction of acoustic tones, therefore, has been to eliminate the acoustic tone in the most sensitive audible range and to replace it with two tones, of high intensity, but in the ultrasonic range.

Figure 2:
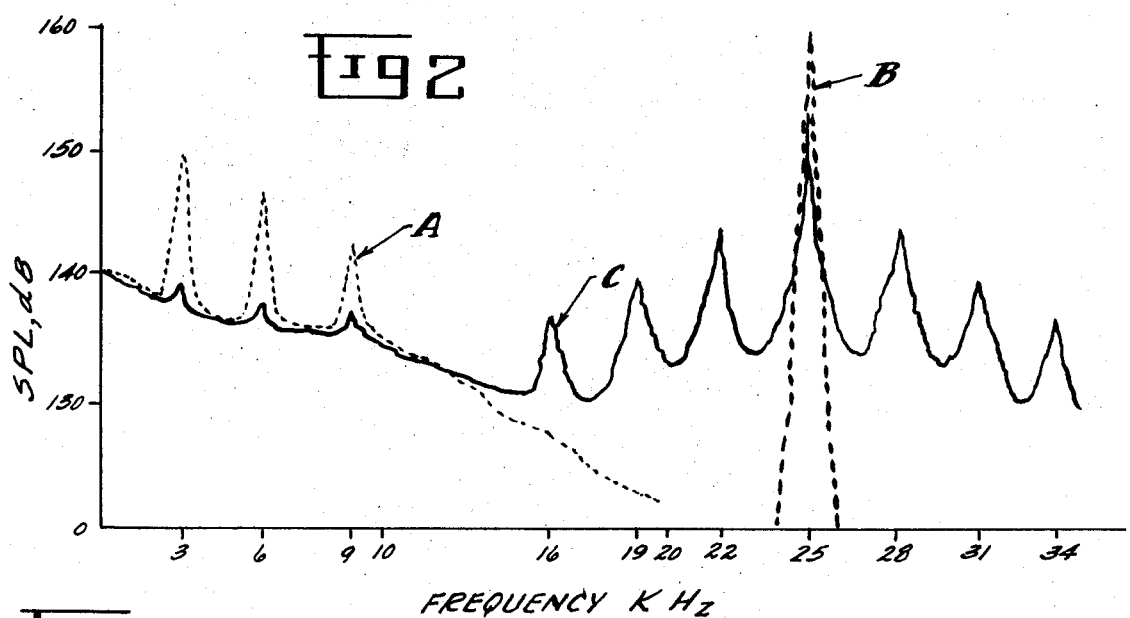
FIG. 2 is a graphical plot of noise data taken from an engine similar to that shown in Fig. 1.

Referring now to Fig. 2, our assumed case is further described by means of a graphical plot of typical test data from an engine similar to that shown in Fig. 1. As shown, curve A represents the output of overall noise generated by the engine alone. Note that the blade passing frequency peaks at approximately 3,000 Hz with harmonics at 6,000 Hz, 9,000 Hz, etc. Curve B represents the output of the auxiliary sound source alone, while curve C represents the overall noise output of the engine with the auxiliary sound source actuated. Note that the auxiliary sound source has modulated the original output to the extent that the 3,000 Hz peak has disappeared and has been replaced with a peak series of in the range from 16,000 to 34,000 Hz. These new peaks are occurring at the sums and differences of the original tones, e.g., (25,000 − 9,000 Hz), (25,000 − 6,000 Hz), (25,000 − 3,000 Hz), (25,000 + 9,000 Hz), etc. Experimentation has also shown that the auxiliary sound source peak (25,000 Hz) will normally be retained.

Further experimentation has shown that the same effect described above may be achieved with an ultrasonic siren which is of a lower intensity than the turbomachinery sound source. The higher intensity, ultrasonic siren is considered, however, to be the more effective of the two choices.

The only known attempt to explain mathematically how two acoustic tones interact so that the original tones disappear and two new tones appear, the new tones being at frequencies which occur at the sum and at the difference of the frequency of the original tones, is given on pages 870 – 873 of "Theoretical Acoustics" by P. M. Morse and K. U. Ingard, McGraw-Hill 1968. Basically, Morse and Ingard attribute the effect to the non-linearity associated with high intensity acoustic waves.

Experimental data generated by the inventors, however, shows that the appearance of the sum tone occurs even without the high intensity levels presumed by Morse and Ingard, provided certain other conditions are present which can also cause non-linearity. One such adequate condition is the presence of higher order acoustic modes of oscillation or the flowing turbulent air within the engine ducts. The higher order modes introduce phase and group velocities which can be made to be different for two sound sources such that the sound energy from one source propagates at a higher speed and passes through the other while the air flow and turbulence systematically and randomly affects the temporal phase relationships of the interacting waves. The principle of linear superposition, as assumed in all solutions to the linearized differential equations for the propagation of sound, then no longer applies. The desired non-linear effect is achieved and the energy interaction described above accomplished.

The higher order nodes of oscillation can be generated in turbomachinery ducts by appropriate choice of the number of rotating blades relative to the number of stationary vanes. They can also be generated by the ultrasonic siren 48 in a practically unlimited number of arrangements. One of these arrangements would simply involve putting the axis of the siren 48 at an angle to the principal coordinate axis of the turbomachinery duct flow path. In this manner, the sound waves generated by the siren 48 would reflect from the internal duct walls and would thus propagate through the duct at a different velocity from that of the turbomachinery noise source. For this reason, it is desirable to place the ultrasonic sirens 48 at an angle with respect to the principal coordinate axis of the fan duct as shown in Fig. 1.

The above principle is not only applicable to the noise generated by the fan 26, but is also applicable to the noise generated by the core engine 12. For this reason, a plurality of ultrasonic sirens 48 are also positioned within the casing 22 immediately downstream of the power turbine 20. The theory behind the use of the sirens in the core engine 12 is identical to that described above with respect to the fan 26. That is, the sirens 48 generate an acoustic tone which interacts with the tone generated by the rotating turbomachinery of the core engine 12 and form two new tones at the sum and difference of the frequencies of the original tones.

Beside modulating the turbomachinery sound source to the ultrasonic range, the introduction of the ultrasonic siren provides a further advantage in that air attenuation increases with frequency. That is, the higher the frequency of the sound source the greater the attenuation is in air. As a result of this, the two new tones generated, besides being in the inaudible range, are attenuated very rapidly in the air.

Figure 3:
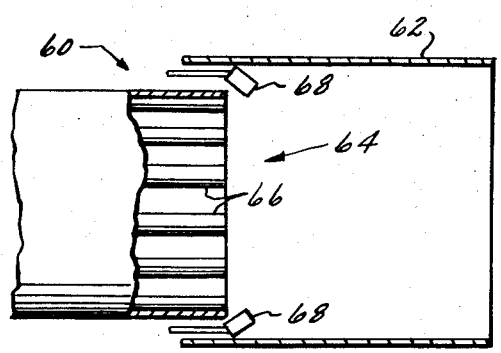
FIG. 3 is a partially schematic, cross-sectional view of a gas turbine exhaust duct incorporating the present invention.

Reference is now made to Fig. 3, wherein the theory of modulation is applied to a gas turbine exhaust nozzle in order to reduce the jet exhaust noise. As shown therein, an exhaust nozzle 60 is surrounded by a duct 62 which extends downstream from the nozzle 60. The nozzle 60 is provided with a jet suppressor 64 which consists of a plurality of exhaust tubes 66 positioned within the nozzle 60. Located around the exhaust nozzle 60 and positioned within the duct 62 are one or more ultrasonic sirens 68.

In contrast to the normal situation, the jet suppressor 64 is not intended for suppression but is intended to cause noise generation to occur within the duct 62 so that the higher order modes of vibration (discussed above in connection with Fig. 1) non-linear interaction will occur. Consequently, the jet suppressor 64 would not have to be of the type which necessitates great performance penalties.

As described above, Applicants have provided both method and apparatus for reducing the annoyance of gas turbine engine noise by modulating the frequency of the noise. In all of the cases described above, the frequency for the auxiliary sound source should be above the audible range since, otherwise, the difference tone may still be in the audible range. While the above description was limited solely to an ultrasonic siren for the auxiliary sound source, it should be readily apparent to those skilled in the art that other sound sources will also be appropriate. For example, an air whistle such as a Hartmann generator may be used.

As previously mentioned, the auxiliary sound source may be of either higher or lower intensity than the turbomachinery noise source, but the higher intensity auxiliary source is preferred. It should be further apparent to those skilled in the art, that the position of the auxiliary sound source may be varied from those shown in FIGS. 1 and 3 without departing from the broader aspects of the inventive concepts described herein. All that is necessary is to position the auxiliary sound source such that it may interact with the turbomachinery sound source or exhaust noise. It is intended that the appended claims cover these and all similar changes in Applicants' inventive concept.

What we claim is:

1. In a gas turbine engine of the type which includes rotating turbomachinery and combustion apparatus for generating a high energy gas stream, said engine generating sound energy in the audible frequency range, the improvement comprising:

an auxiliary sound source positioned within said engine, said sound source including means for generating sound energy in the ultrasonic frequency range, and said sound source being positioned such that said ultrasonic sound energy modulates the audible sound energy and produces new tones in the inaudible range, said new tones occurring at frequencies at the sums and differences of the frequencies of the original tones.

2. Apparatus as recited in claim 1 wherein said means for generating sound energy in the ultrasonic frequency range comprises one or more ultrasonic sirens.

3. Apparatus as recited in claim 2 wherein said ultrasonic siren has a sound pressure level greater than the sound pressure level of the audible sound energy.

4. Apparatus as recited in claim 3 wherein said audible sound energy is generated by said rotating turbomachinery.

5. Apparatus as recited in claim 1 wherein said means for generating sound energy in the ultrasonic frequency range comprises one or more air whistles.

6. Apparatus as recited in claim 5 wherein said air whistles have a sound pressure level which is greater than the sound pressure level of said audible sound energy.

7. Apparatus as recited in claim 1 wherein said audible sound energy is generated by a multi-type suppressor positioned within an exhaust nozzle of said gas turbine engine.

8. Apparatus as recited in claim 7 wherein said means for generating sound energy in the ultrasonic frequency range comprises one or more ultrasonic sirens.

9. Apparatus as recited in claim 7 wherein said means for generating sound energy in the ultrasonic frequency range comprises one or more air whistles.

10. A method for reducing the annoyance of sound energy emanating from a gas turbine engine comprising the steps of:

generating an audible sound tone within said engine;
generating an ultrasonic sound tone of higher intensity than said audible sound tone within said engine; and
coupling said audible sound tone and said ultrasonic sound tone whereby said ultrasonic sound level will modulate said audible sound level to provide new sound tones in the inaudible sound range, said new sound tones occuring at frequencies at the sums and differences of the frequencies of the original sound.

* * * * *